United States Patent
Hamilton et al.

(10) Patent No.: US 12,549,204 B2
(45) Date of Patent: Feb. 10, 2026

(54) COMBINED INTERROGATOR AND TRANSPONDER WITH AN OMNIDIRECTIONAL ANTENNA

(71) Applicant: Sagetech Avionics, Inc., White Salmon, WA (US)

(72) Inventors: Matthew Hamilton, White Salmon, WA (US); Tom Furey, White Salmon, WA (US)

(73) Assignee: Sage Avionics, Inc., While Salmon, WA (US)

( * ) Notice: Subject to any disclaimer, the term of this patent is extended or adjusted under 35 U.S.C. 154(b) by 387 days.

(21) Appl. No.: 18/126,413

(22) Filed: Mar. 25, 2023

(65) Prior Publication Data

US 2023/0308120 A1 Sep. 28, 2023

Related U.S. Application Data

(60) Provisional application No. 63/324,627, filed on Mar. 28, 2022.

(51) Int. Cl.
*H04B 1/00* (2006.01)
*H04B 17/19* (2015.01)
*H04B 17/29* (2015.01)

(52) U.S. Cl.
CPC ............ *H04B 1/006* (2013.01); *H04B 17/19* (2015.01); *H04B 17/297* (2023.05)

(58) Field of Classification Search
CPC ....... H04B 1/006; H04B 17/19; H04B 17/297
See application file for complete search history.

(56) References Cited

U.S. PATENT DOCUMENTS

| 9,369,187 | B1* | 6/2016 | Sammeta ............. H04B 7/0802 |
| 2007/0111697 | A1 | 5/2007 | Bellantoni |
| 2008/0238759 | A1 | 10/2008 | Carocari et al. |
| 2008/0266166 | A1 | 10/2008 | Schuchman |
| 2017/0131411 | A1 | 5/2017 | Yun et al. |

(Continued)

FOREIGN PATENT DOCUMENTS

| CN | 102780504 A | 11/2012 |
| WO | 1991019363 A1 | 12/1991 |

OTHER PUBLICATIONS

International Search Report and Written Opinion, PCT Appl. No. PCT/US2023/016425, Mar. 19, 2024.

*Primary Examiner* — Junpeng Chen
(74) *Attorney, Agent, or Firm* — Steven Stupp

(57) ABSTRACT

An electronic device is described. This electronic device may include a communication circuit (such as an integrated circuit) that combines an interrogator and a transponder. Notably, the communication circuit may dynamically and temporally interleave an interrogator or the transponder transmission with a transponder response to a second interrogator or the second transponder transmission associated with a second electronic device. Moreover, the electronic device may include or may be selectively electrically coupled to at least an omnidirectional antenna that is used for bidirectional communication, such as: transmitting the interrogator or the transponder transmission (or message), receiving the second interrogator or the second transponder transmission (or message), and/or transmitting the transponder response to the second interrogator or the second transponder transmission.

20 Claims, 5 Drawing Sheets

(56) References Cited

U.S. PATENT DOCUMENTS

| | | | |
|---|---|---|---|
| 2017/0185737 A1* | 6/2017 | Kovacs | A61B 5/02416 |
| 2021/0297128 A1* | 9/2021 | Badic | G01S 5/0284 |
| 2023/0299835 A1* | 9/2023 | Svendsen | H04B 7/0617 |
| | | | 375/267 |

* cited by examiner

COMBINED INTERROGATOR AND TRANSPONDER WITH AN OMNIDIRECTIONAL ANTENNA

CROSS REFERENCE TO RELATED APPLICATIONS

This application claims priority under 35 U.S.C. 119(e) to U.S. Provisional Application Ser. No. 63/324,627, "Combined Interrogator and Transponder with an Omnidirectional Antenna," filed on Mar. 28, 2022, by Matthew Hamilton, et al., the contents of which are herein incorporated by reference.

FIELD

The described embodiments relate to a combined interrogator and transponder for use in an airborne detection and/or avoidance systems, e.g., with at least an omnidirectional antenna.

BACKGROUND

A transponder is an electronic device that transmits a response when it receives a radio-frequency interrogation. In contrast with a transceiver, which transmits and receives using a common carrier frequency, a transponder transmits and receives using different carrier frequencies. Moreover, an interrogator is an electronic device that transmits a radio-frequency interrogation signal using one carrier frequency and receives a response using a different carrier frequency.

Aircraft are typically required to include interrogators and transponders. For example, transponders are used to assist in identifying an aircraft, e.g., on air traffic control radar. In addition, collision avoidance systems have been developed that use interrogator or transponder transmissions and transponder responses to detect and avoid aircraft that are at risk of colliding with each other. For example, the Federal Aviation Administration (FAA) in the United States mandated the use of the Traffic Alert and Collision Avoidance System (TCAS), which is a collision avoidance system and air-to-air communication technique for piloted civilian aircraft using transponder messages. Notably, the FAA regulation Title 14, CFR Part 121.356 requires TCAS for aircraft above 33,000 lb. carrying more than 10 passengers. Note that TCAS is a rule-based approach in which aircraft in flight cooperatively avoid a potential collision or threat by performing a vertical avoidance maneuver, such as climbing or descending.

TCAS is not used for helicopters or unmanned aircraft, such as drones. Currently, unless a professional waiver is granted by the FAA, the absence of a collision avoidance system for drones restricts their use to visual line of sight by the operator or to use in conjunction with a separate visual observer. Notably, Title 14 CFR Part 91.113 requires pilots to see and avoid other aircraft. If an aircraft wants to operate under Part 91 regulations, then it needs to meet this requirement. Moreover, the use of an onboard detect and avoid system can be used to meet the intent of this requirement.

In order to address these and other challenges, enhanced collision avoidance systems, such as the Airborne Collision Avoidance System (ACAS) X or another technique associated with the Radio Technical Commission for Aeronautics or RTCA (of Washington DC), are being developed. ACAS X is intended for use by a variety of different types of aircraft. For example, in addition to use with a cooperative aircraft, ACAS X may be used to detect and avoid a threat associated with a cooperative or an uncooperative aircraft (such as a drone or an aircraft that cannot communicate with you) or birds. Notably, ACAS X may use an input from a cooperative source, such as an Automatic Dependent Surveillance-Broadcast (ADS-B) message. ADS-B are Global Positioning System (GPS)-based automatic transmissions that are provided approximately 6x/s.

There are, however, concerns about the reliability of this type of input. Notably, ADS-B transmissions are not encrypted and are based on weak GPS signals. Consequently, ADS-B messages can be jammed or spoofed.

In principle, an aircraft can perform additional measurements to validate transponder broadcast information, such as ADS-B messages. For example, when a transponder includes one or more directional antenna, directional measurements can be performed to localize another aircraft and, thus, to verify its track, as specified by the transponder broadcast information from the other aircraft.

However, in practice, the use of directional antennas increases the size, weight and cost of transponders. Larger and heavier transponders are problematic or prohibitive in many aircraft applications, such as in unmanned aircraft (e.g., drones), where there are strong constraints on the size and weight of transponders because of limited lift and flight-time capabilities.

Similarly, the use of separate interrogators and transponders increases the size, weight and cost of aircraft and are prohibitive in many aircraft applications. Notably, it is typically difficult to integrate an interrogator and a transponder into a combined platform. Notably, transmissions often use multiple carrier frequencies and high power, such as 57 dBm or 500 W with a 1% duty cycle. These transmissions can result in interference on adjacent frequencies. In order to address this challenge in airborne applications, a transmission mask with tight tolerances is usually needed for aviation compliance. For example, transmissions proximate to a given carrier frequency typically have a very narrow bandpass shape to ensure that there is little bleed through outside of the bandpass bandwidth. In particular, the bandpass shape may proximate to the given carrier frequency may be: −20 dB at ±7 MHz, −40 dB at ±23 MHz, and −60 dB at ±80 MHz. These tight tolerances often preclude the use of a software-defined radio that can be dynamically reconfigured as an interrogator or a transponder.

SUMMARY

An electronic device is described. This electronic device includes a communication circuit (such as an integrated circuit) that combines an interrogator and a transponder. Notably, the communication circuit (such as based at least in part on control signals provided by a control circuit in the communication circuit) dynamically and temporally interleaves an interrogator or a transponder transmission with a transponder response to a second interrogator or a second transponder transmission associated with a second electronic device. Moreover, the electronic device includes or is selectively electrically coupled to at least an omnidirectional antenna that is used for bidirectional communication, such as: transmitting the interrogator or the transponder transmission (or message), receiving the second interrogator or the second transponder transmission (or message), and/or transmitting the transponder response to the second interrogator or the second transponder transmission.

Note that, in some embodiments, the electronic device may interleave an ADS-B message with an instance of the transponder response, where the ADS-B message is not in response to an interrogator or a transponder transmission.

Furthermore, the communication circuit may include a transmit chain. The transmit chain may adjust (e.g., by the control circuit) a carrier frequency over a spectrum of frequencies. For example, the carrier frequency may include: 978 MHz, 1030 MHz, 1090 MHz, 1104 MHz or another carrier frequency associated with TCAS, ACAS, ADS-B, another collision detection and avoidance system, or another vehicle-to-vehicle (V2V) communication system.

Additionally, the electronic device may include or may be selectively electrically coupled to a second omnidirectional antenna. Moreover, the communication circuit may include a switching network (e.g., PIN diodes) that provides isolation exceeding a predefined value between the omnidirectional antenna and the second omnidirectional antenna. For example, when transmitting the interrogator or the transponder transmission, the control circuit may: selectively electrically couple the transmit chain to the omnidirectional antenna using a first switch in the switching network; selectively electrically decouple the transmit chain from the second omnidirectional antenna using a second switch in the switching network; and selectively electrically couple the second omnidirectional antenna to ground using a third switch in the switching network.

Furthermore, the communication circuit may include multiple receive chains associated with different carrier frequencies in the spectrum of frequencies, where a given receive chain is associated with a given carrier frequency. Additionally, the given receive chain may include a heterodyne receiver that down converts a received electrical signal corresponding to the second interrogator or the second transponder transmission to baseband. Note that the communication circuit may include a transmit/receive switch. When the communication circuit is transmitting the interrogator or the transponder transmission or the transponder response, the control circuit may electrically decouple the receive chains from at least the omnidirectional antenna. Alternatively, when the communication circuit is not transmitting the interrogator or the transponder transmission or the transponder response, the control circuit may selectively electrically couple the receive chains in parallel with at least the omnidirectional antenna.

In some embodiments, the communication circuit includes a self-test path. When the communication circuit has not received an instance of the second interrogator or the second transponder transmission with a predefined time interval (and when the communication circuit is not transmitting the interrogator or the transponder transmission or the transponder response), the control circuit may (e.g., using a switch) selectively electrically couple an output of the transmit chain to an input of an amplifier in the receive chain, and may selectively electrically couple a modulated signal to determine whether a power level and/or a modulation of the modulated signal are correct (and, thus, whether the transponder is working correctly).

Moreover, the electronic device may: receive ADS-B messages associated with a third electronic device; calculate received signal strengths of the ADS-B messages; and determine a range between the electronic device and the third electronic device, a relative bearing of the electronic device and the third electronic device, or both based at least in part on: the received signal strengths, a heading of the electronic device, and an airspeed of the electronic device. Furthermore, when the range is less than a predefined value, the electronic device may compute a transmit power of the interrogator transmission based at least in part on the received signal strength and the determined range. Note that in these embodiments the interrogator transmission may validate data associated with at least one of the ADS-B messages (e.g., by measuring the time-of-flight of the validation interrogation and calculating the range).

Another embodiment provides the communication circuit.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

DRAWINGS

Note that like reference numerals refer to corresponding parts throughout the drawings. Moreover, multiple instances of the same part are designated by a common prefix separated from an instance number by a dash.

DETAILED DESCRIPTION

An electronic device is described. This electronic device may include a communication circuit (such as an integrated circuit) that combines an interrogator and a transponder. Notably, the communication circuit may dynamically and temporally interleave an interrogator or a transponder transmission with a transponder response to a second interrogator or a second transponder transmission associated with a second electronic device. Moreover, the electronic device may include or may be selectively electrically coupled to at least an omnidirectional antenna that is used for bidirectional communication, such as: transmitting the interrogator or the transponder transmission (or message), receiving the second interrogator or the second transponder transmission (or message), and/or transmitting the transponder response to the second interrogator or the second transponder transmission.

By combining the interrogator and the transponder, these circuit techniques may reduce the size, weight and/or cost of the electronic device. Notably, the communication circuit may be used in aircraft, such as drones, which are sensitive to these criteria, while ensuring regulatory compliance with collision detection and avoidance systems. For example, the communication circuit may comply with regulations provided by the FAA, the European Aviation Safety Agency (EASA), or another aviation regulatory agency. Notably, the communication circuit may provide: a fixed delay for the transponder response; and/or an ability to schedule the interrogator or the transponder transmission (e.g., to determine a track of another aircraft, such as the location or position, heading, altitude and/or speed of the other aircraft, or for vehicle-to-vehicle or V2V communication). Moreover, the communication circuit may provide a flexible or programmable architecture (such as a software-defined radio) the covers a broad spectrum of frequencies. Consequently, the circuit techniques may provide additional design degrees of freedom and cost savings for aircraft, including aircraft that are lightweight or that have limited power (such as a drone).

In the discussion that follows, the electronic device may include or may be included in an aircraft, such as a manned or an unmanned aircraft. For example, the electronic device may include an aircraft, such as: an airplane, a helicopter, a glider, a drone, an airborne taxi or another type of aircraft.

Figure 1:
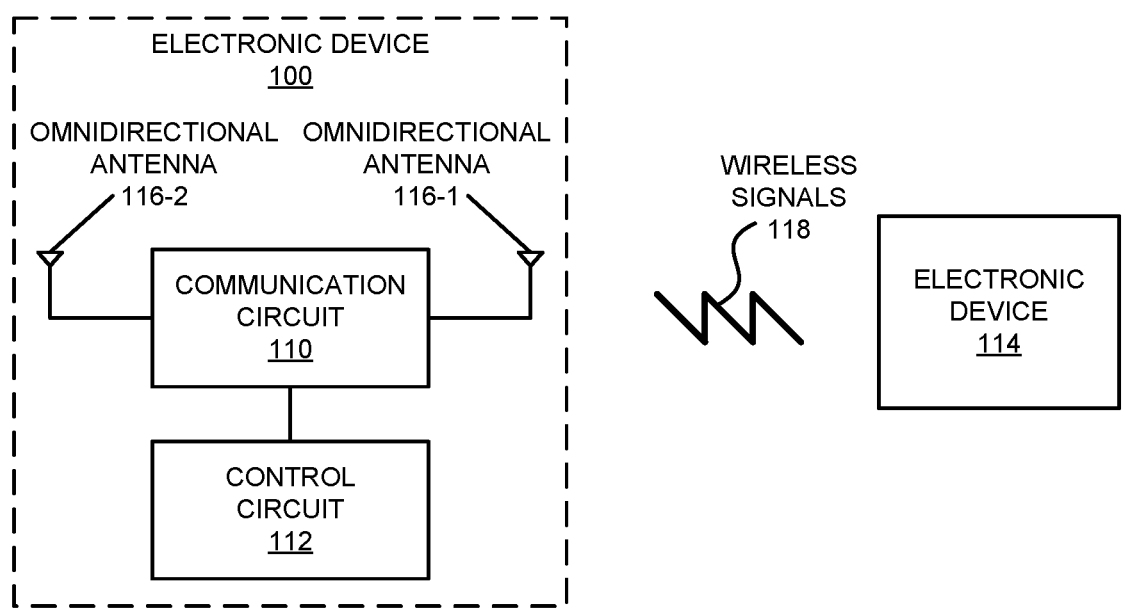
FIG. 1 is a block diagram illustrating an example of an electronic device according to some embodiments of the present disclosure.

We now further describe the circuit techniques. FIG. 1 presents a block diagram illustrating an example of an electronic device 100. This electronic device may include a communication circuit 110 (such as an integrated circuit) that combines an interrogator and a transponder. Notably, a control circuit 112 in communication circuit 110 may dynamically and temporally interleave, as needed, an interrogator or the transponder transmission with a transponder response to a second interrogator or a second transponder transmission associated with electronic device 114 (such as another aircraft, air traffic control, a ground control station, etc.). Moreover, electronic device 100 may include or may be selectively electrically coupled to at least an omnidirectional antenna 116-1 that is used for bidirectional communication, such as: transmitting the interrogator or the transponder transmission, receiving the second interrogator or the second transponder transmission, and/or transmitting the transponder response to the second interrogator or the second transponder transmission. The interrogator or the transponder transmission, the second interrogator or the second transponder transmission or the transponder response may be associated with wireless signals 118.

Note that in some embodiments electronic device 100 may include or may be selectively electrically coupled to omnidirectional antenna 116-1 and an omnidirectional antenna 116-2, which each may be used for bidirectional communication. For example, omnidirectional antenna 116-1 may be located on or proximate to a top of an aircraft and omnidirectional antenna 116-2 may be located on or proximate to a bottom of an aircraft. The omnidirectional antennas 116 may provide antenna diversity. Furthermore, the use of multiple omnidirectional antennas 116 may provide more accurate range measurements. In some embodiments, multiple omnidirectional antennas (such as four omnidirectional antennas) may provide angular information (such as a bearing to the second electronic device). Alternatively, whether the transmissions from multiple omnidirectional antennas are synchronized (with an adjustable or selectable relative phase delay and/or transmit power difference), electronic device 100 may perform beam steering (such as towards a front, a side or a back direction).

Figure 2:
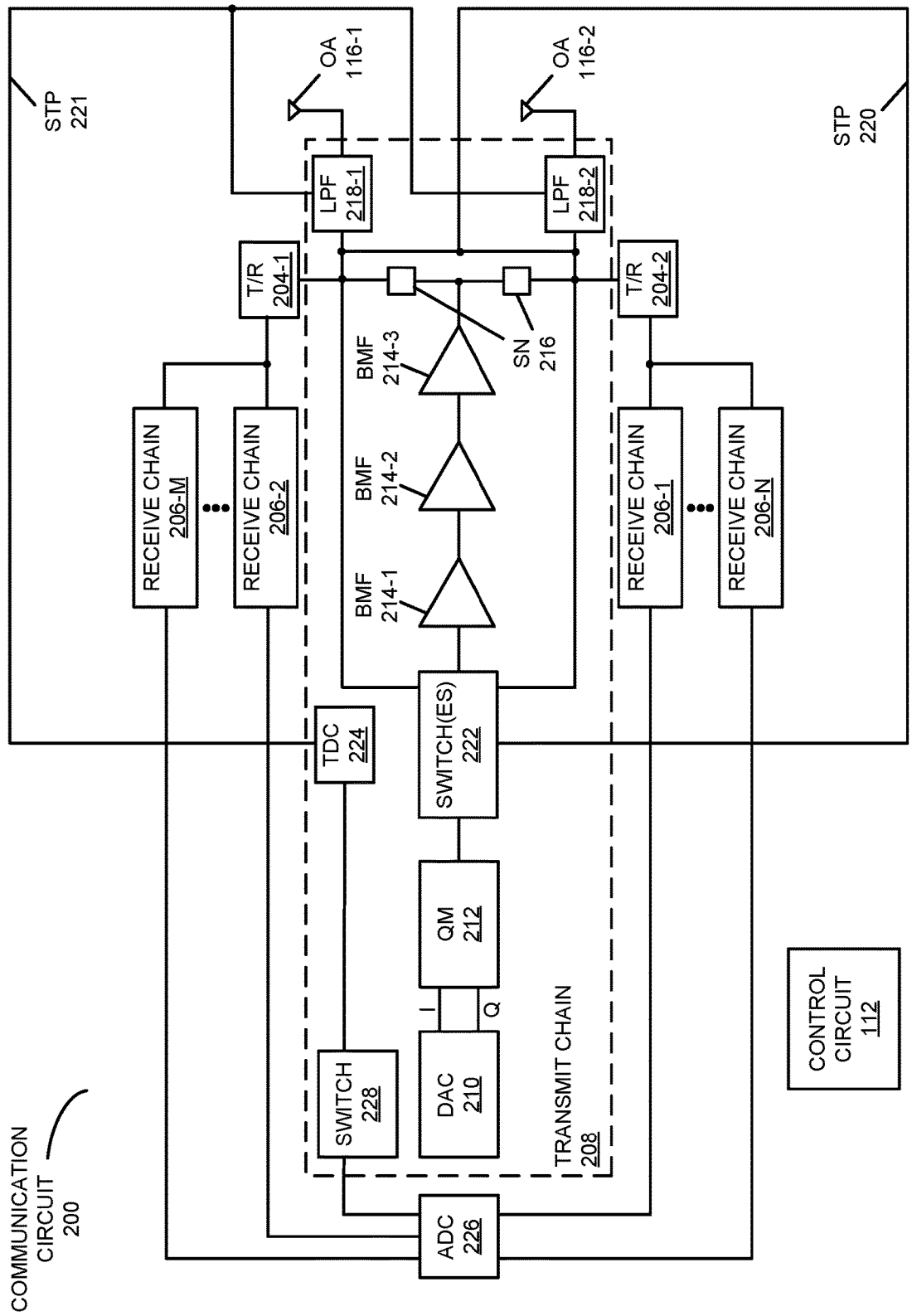
FIG. 2 is a block diagram illustrating an example of a communication circuit according to some embodiments of the present disclosure.

Moreover, as shown in FIG. 2, which presents a block diagram illustrating an example of a communication circuit 200 (such as some embodiments of communication circuit 110), there may be multiple receive chains 206 (such as N or M receive chains, where N and M are non-zero integers) associated with different carrier frequencies, such as 978 MHz, 1030 MHz, 1090 MHz, 1104 MHz or another carrier frequency associated with TCAS, ACAS, ADS-B, another collision detection and avoidance system, or another V2V communication system. Moreover, as described further below, communication circuit 200 may include a transmit/receive switch 204-1 that selectively couples receive chains 206 in parallel to at least omnidirectional antenna 116-1.

Figure 3:
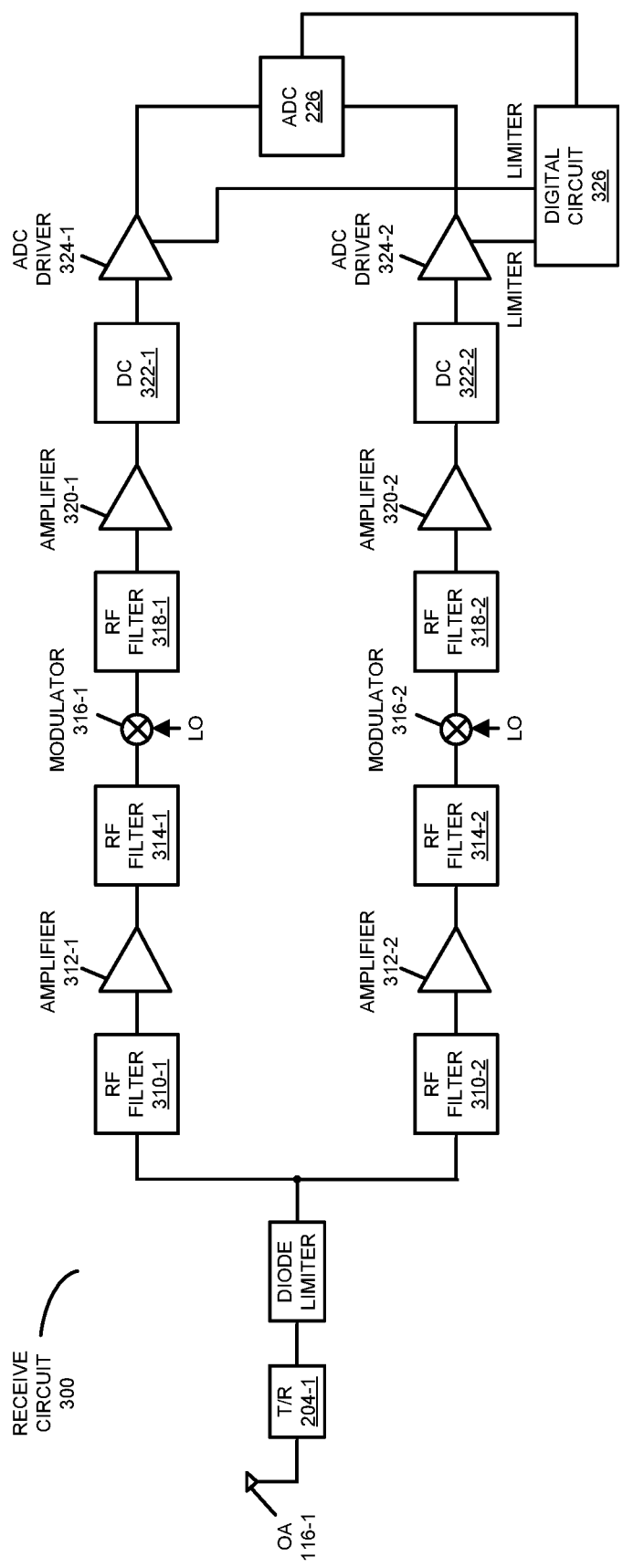
FIG. 3 is a block diagram illustrating an example of a receive chain according to some embodiments of the present disclosure.

Furthermore, as shown in FIG. 3, which presents a block diagram illustrating an example of a receive chain 300 (such as some embodiments of a given one of receive chains 206), the second interrogator or the second transponder transmission may be received using a heterodyne receiver. For example, the heterodyne receiver may include: a radio-frequency (RF) filter 310-1 (such as a surface acoustic wave filter centered at 1090 MHz), an amplifier 312-1, an optional RF filter 314-1, a mixer 316-1 that down converts a given carrier frequency in a receive electrical signal corresponding to the second interrogator or the second transponder transmission to an intermediate frequency (such as 80 MHz) by mixing with a local oscillator or LO (such as 1170 MHz), an amplifier 318-1, a filter 320-1, and a detector circuit (DC) 322-1 (such as a log detector circuit) that outputs a baseband electrical signal. Note that detector circuit 322-1 may perform: phase detection, and/or amplitude detection. For example, the baseband electrical signal may be encoded using: pulse-amplitude modulation (PAM), pulse-position modulation (PPM), pulse-code modulation (PCM), pulse-width modulation (PWM), phase-shift keying (PSK), differential phase shift keying (DPSK), minimum-shift keying (MSK), frequency-shift keying (FSK), amplitude modulation (AM), and/or another modulation technique. Note that a second instance of the components in the heterodyne receiver may be used to receive the second interrogator or the second transponder transmission with a carrier frequency of 1030 MHz (e.g., RF filter 310-2 may have a center frequency of 1030 MHz, and the intermediate frequency may be 140 MHz).

In some embodiments, receive chain 300 may include an optional analog-to-digital converter (ADC) driver 324-1 and an ADC 226 that converts the baseband electrical signal output from detector circuit 322-1 from an analog to a digital domain. Alternatively or additionally, the communication circuit may include a digital circuit 326 (which may be the same as or different from control circuit 112 in FIGS. 1 and 2). For example, digital circuit 326 may include: a digital signal processing (DSP) circuit and/or a field programmable gate array (FPGA). Digital circuit 326 may detect phase shifts in the baseband electrical signal(s) output from receive chain 300.

Referring back to FIG. 2, communication circuit 200 may also include a transmit chain 208. Notably, transmit chain 208 may include: a digital-to-analog convert (DAC) 210 that outputs a first transmit signal (I) and a second transmit signal (Q), which may be in quadrature with the first transmit signal. For example, the first transmit signal and the second transmit signal may correspond to: the interrogator or the transponder transmission, or the transponder response to the second interrogator or the second transponder transmission. Note that DAC 210 may encode the first transmit signal and the second transmit signal using one or more of a variety of modulation techniques, such as: PAM, PPM, PCM, PWM, PSK, DPSK, MSK, FSK, AM, and/or another modulation technique. In some embodiments, the modulation technique used by DAC 210 is controlled by control circuit 112.

The first transmit signal and the second transmit signal may be input to a quadrature modulator (QM) 212 that outputs a modulated signal having a given carrier frequency, such as: 978 MHz, 1030 MHz, 1090 MHz, 1104 MHz or another carrier frequency associated with TCAS, ACAS, ADS-B, another collision detection and avoidance system, or another V2V communication system. Note that quadrature modulator 212 may include a phase-locked loop (PLL) that is programmable (e.g., by control circuit 112) between 950-1595 MHz with a switching time that is less than 200 µs. Furthermore, quadrature modulator 212 may have a programmable attenuation stage with an adjustable attenuation of an output modulation signal between 9-57 dBm using 0-47 dB steps, with a minimum non-zero step size of 1 dB.

Furthermore, the modulated signal may be filtered using a set of broadband matching filters (BMFs) 214 arranged in series, including: a broadband matching filter 214-1, a broadband matching filter 214-2 (which may have a high power or amplification and low impedance), a broadband matching filter 214-3 (which may have a high power or amplification and low impedance). Note that the bandpass bandwidth of each of the set of broadband matching filters 214 may encompass the given carrier frequency (such as: 978 MHz, 1030 MHz, 1090 MHz, 1104 MHz or another carrier frequency associated with TCAS, ACAS, ADS-B, another collision detection and avoidance system, or another V2V communication system), and each of the set of broadband matching filters 214 may have a gain of 15-20 dB. Additionally, broadband matching filter 214-1 may have an impedance of 50Ω, and broadband matching filter 214-2 and broadband matching filter 214-3 may each have an impedance less than 10Ω (which may make broadband matching filter 214-2 and broadband matching filter 214-3 sensitive to changes in the set of broadband matching filters 214).

In some embodiments, an output filtered modulated signal from broadband matching filter 214-3 may be filtered using one of low-pass filters (LPFs) 218 having a 1200 MHz corner frequency and the resulting transmission signal may be selectively electrically coupled to at least omnidirectional antenna (OA) 116-1. Note that each of low-pass filters 218 may implement a filter with nulls at harmonics of one or more carrier frequencies. Moreover, note that an output power of the filtered modulated signal (which may be the interrogator or the transponder transmission or the transponder response) may be 9-57 dBm.

Additionally, in embodiments where electronic device 100 (FIG. 1) is used with or includes omnidirectional antenna 116-2, communication circuit 200 may provide strong isolation between omnidirectional antenna 116-1 and omnidirectional antenna 116-2. For example, the isolation for a given omnidirectional antenna may reduce the interference from transmissions associated with the other omnidirectional antenna by at least −20 dB (such as 30 dB of isolation). Notably, communication circuit 200 may include a PIN-diode switching network (SN) 216 (such as a push-pull four PIN-diode or switch topology that is controlled by the control circuit) to provide the isolation.

Figure 4:
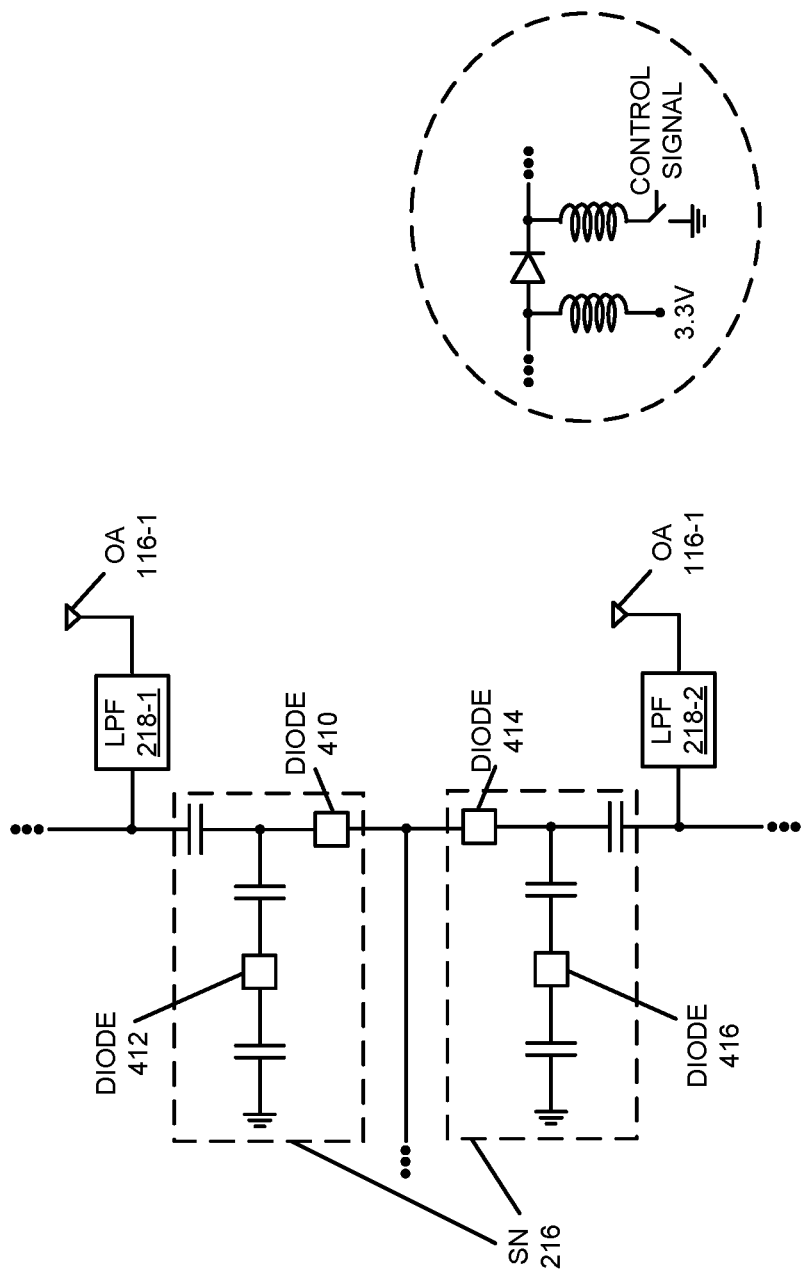
FIG. 4 is a block diagram illustrating an example of a PIN-diode switching network according to some embodiments of the present disclosure.

This is shown in FIG. 4, which presents a block diagram illustrating an example of a PIN-diode switching network 216. Operation of PIN-diode switching network 216 is described further below.

Referring back to FIG. 2, note that the use of omnidirectional antenna 116-1 and omnidirectional antenna 116-2 may eliminate a need for multiple instances of communication circuit 200 in electronic device 100 (FIG. 1), which may occur when directional antennas are used. Thus, electronic device 100 (FIG. 1) may have three fewer instances of communication circuit 200 than other implementations. Consequently, in these embodiments, electronic device 100 (FIG. 1) may be lighter, simpler and/or may have a reduced cost than the other implementations.

However, while the preceding discussion illustrated the use of communication circuit 200 with at least omnidirectional antenna 116-1, in other embodiments electronic device 100 (FIG. 1) may include or may be selectively electrically coupled to at least a directional antenna. Thus, in some embodiments, electronic device 100 (FIG. 1) may include or may be selectively electrically coupled to an omnidirectional antenna, a directional antenna, or both. In embodiments with one or more directional antennas, the transmit chain may be shared (which may have an increase in the amplification associated with a power amplifier), and there may be multiple additional instances of receive chains 206 that are associated with different directional antennas, where given receive chains are associated with a given directional antenna.

In some embodiments, communication circuit 200 includes a self-test path (STP) 220 that selectively electrically couples an output of broadband matching filter 214-3 to an input of one or more of receive chains 206, e.g., using one or more switches 222 that are controlled by control circuit 112. This self-test path may be used to detect whether there are any problems with receive chains 206 in communication circuit 200. When the selectively coupling is established, a test pulse (or test signal) may be output by DAC 210 and monitored by one or more of receive chains 206 to check for circuit health. Moreover, self-test path 221 may selectively electrically couple the output of broadband matching filter 214-3 to the input of a test detector circuit (TDC) 224 during each transmission (such as an interrogator or a transponder transmission) to monitor whether the data, modulation and/or output power level are correct. Note that the test detector circuit output may be electrically coupled to ADC 226 by a switch 228.

Because of regulatory requirements, when an aircraft is interrogated (e.g., using an all-call or a mode C or mode S interrogation), a transponder response may need to be transmitted within a predefined time interval, such as 3.5 µs for mode A/C or 128 µs for mode S. Consequently, communication circuit 200 may operate with the PLL in quadrature modulator 212 set to use a carrier frequency of 1090 MHz as a default. In response to receiving an instance of the second interrogator or the second transponder transmission, control circuit 112 may close a series shunt PIN diode 410 (FIG. 4) to one of the omnidirectional antennas (such as omnidirectional antenna 116-1) and may open a connected PIN diode 412 (FIG. 4) to ground. In addition, control circuit 112 may open a series shunt PIN diode to 414 (FIG. 4) the other omnidirectional antenna (such as omnidirectional antenna 116-2) and may close a connected PIN diode 416 (FIG. 4) to ground. Then, communication circuit 200 may transmit the transponder response, such as a pulse at 1090 MHz. This pulse may have a duration up to 120 µs (such as 21, 60 or 120 µs). After the pulse has been transmitted (such as after the pulse duration), control circuit 112 may open the series shunt PIN diode 410 (FIG. 4) and may open the connected PIN diode 412 (FIG. 4) to ground. Note that the inset in FIG. 4 illustrates a given one of PIN diodes 410, 412, 414 and 416.

When transmitting the transponder response, control circuit 112 may change a state of transmit/receive switches (T/R) 204 to disconnect or electrically decouple receive chains 206 from omnidirectional antenna(s) 116. Moreover, after the transponder response has been transmitted (such as after the pulse duration), control circuit 112 may change the state of transmit/receive switches 204 to selectively connect or electrically couple receive chains 206 to omnidirectional antenna(s) 116. In this way, when not transmitting the transponder response (or the interrogator or the transponder transmission), communication circuit 200 may listen for an instance of the second interrogator or the second transponder transmission.

Furthermore, when communication circuit 200 intends to transmit the interrogator or the transponder transmission (such as an ADS-B validation or a request for track information), control circuit 112 may switch the PLL in quadrature modulator 212 from 1090 MHz to 1030 MHz. After the switching, the PLL may take at least 170 µs to stabilize. Moreover, after the PLL is stabilized, control circuit 112 may close the series shunt PIN diode 410 (FIG. 4) to a one of the omnidirectional antennas (such as omnidirectional antenna 116-1) and may open the parallel PIN diode 412 (FIG. 4) to ground. In addition, control circuit 112 may open the series shunt PIN diode to 414 (FIG. 4) the other omnidirectional antenna (such as omnidirectional antenna 116-2) and may close the parallel PIN diode 416 (FIG. 4) to ground. Then, communication circuit 200 may transmit the interrogator or the transponder transmission, such as a pulse train at 1030 MHz. This pulse train may have a duration up to 60 µs pulse at 1030 MHz (such as 20, 21 or 34 µs). After the pulse has been transmitted (such as after the pulse duration), control circuit 112 may open the series shunt PIN diode 410 (FIG. 4) and may open the connected PIN diode 412 (FIG. 4) to ground. Moreover, communication circuit 200 may switch the PLL in quadrature modulator 212 from 1030 MHz to 1090 MHz. After the switching, the PLL may once again take at least 170 µs to stabilize. Thus, communication circuit 200 may not be available to transmit a transponder response at 1090 MHz for 460 µs.

When transmitting the interrogator or the transponder transmission, control circuit 112 may change the state of transmit/receive switches 204 to disconnect or electrically decouple receive chains 206 from omnidirectional antenna(s) 116. Moreover, after the interrogator or the transponder transmission has been transmitted (such as after the pulse duration), control circuit 112 may change the state of transmit/receive switches 204 to selectively connect or electrically couple receive chains 206 to omnidirectional antenna(s) 116. In this way, when not transmitting the interrogator or the transponder transmission (or the transponder transmission), communication circuit 200 may listen for an instance of the second interrogator or the second transponder transmission (including during the 170 µs settling time of the PLL).

Note that when communication circuit 200 receives an instance of the second interrogator or the second transponder transmission, a self-test using self-test path 220 may not be performed. Otherwise, when an instance of the second interrogator or the second transponder transmission (and, more generally, a receive message) is not received within a time interval (such as 1 min.), communication circuit 200 may perform a self-test using self-test path 200.

While the preceding discussion illustrated the circuit techniques, in other embodiments the circuit techniques and the embodiments of the communication circuit and/or the electronic device may include additional or fewer operations. Furthermore, the order of the operations may be changed, there may be different operations, two or more operations may be combined into a single operation, and/or a single operation may be divided into two or more operations.

In some embodiments, electronic device 100 (FIG. 1) may: receive ADS-B messages associated with a third electronic device (which may be the same as or different from electronic device 114 in FIG. 1); calculate received signal strengths of the ADS-B messages; and determine a range between electronic device 100 (FIG. 1) and the third electronic device and/or a relative bearing of electronic device 100 (FIG. 1) and the third electronic device based at least in part on: the received signal strengths, a heading of electronic device 100 (FIG. 1), and an airspeed of electronic device 100 (FIG. 1). Furthermore, when the range is less than a predefined value, electronic device 100 (FIG. 1) may compute a transmit power of the interrogator or the transponder transmission based at least in part on the received signal strength and the determined range. Note that in these embodiments the interrogator transmission may validate data associated with at least one of the ADS-B messages (e.g., by measuring the time-of-flight of the validation interrogation and calculating the range)

For example, electronic device 100 (FIG. 1) may use the received signal strength of the ADS-B messages with a power-trend technique. Notably, the power-trend technique may use heading and airspeed of electronic device 100 (FIG. 1). Electronic device 100 (FIG. 1) may analyze the power trend of the received signals from an intruder aircraft to determine whether electronic device 100 (FIG. 1) is getting closer or further away from the intruder aircraft. In some embodiments, electronic device 100 (FIG. 1) may determine relative bearing within ±90°. When electronic device 100 (FIG. 1) determines that the received signal strength is getting stronger, then a range between electronic device 100 (FIG. 1) and the intruder is decreasing. Note that there may be different slopes of the trend lines based at least in part on airspeed.

In some embodiments, electronic device 100 (FIG. 1) may use the received signal strength and slant range measurements to compute a transmit power when transmitting an interrogation transmission to validate data associated with at least one of the ADS-B messages. For example, the power-trend technique may be used to validate the data associated with at least one of the ADS-B messages until the range to the intruder was less than a remain well clear bubble. Then, electronic device 100 (FIG. 1) may selectively transmit interrogation transmissions at the computed transmit power in order to avoid overwhelming the spectrum when validating the data associated with at least the ADS-B message.

Note that, in some embodiments, electronic device 100 (FIG. 1) may interleave an ADS-B message with an instance of a transponder response, where the ADS-B message is not in response to an interrogator or a transponder transmission.

In the preceding discussion, note that the carrier frequency of a transmitted interrogation may be the same as the carrier frequency of a received interrogation. Moreover, received responses to interrogations and received ADS-B messages may be on the same carrier frequency, which is different from the interrogation carrier frequency.

Figure 5:
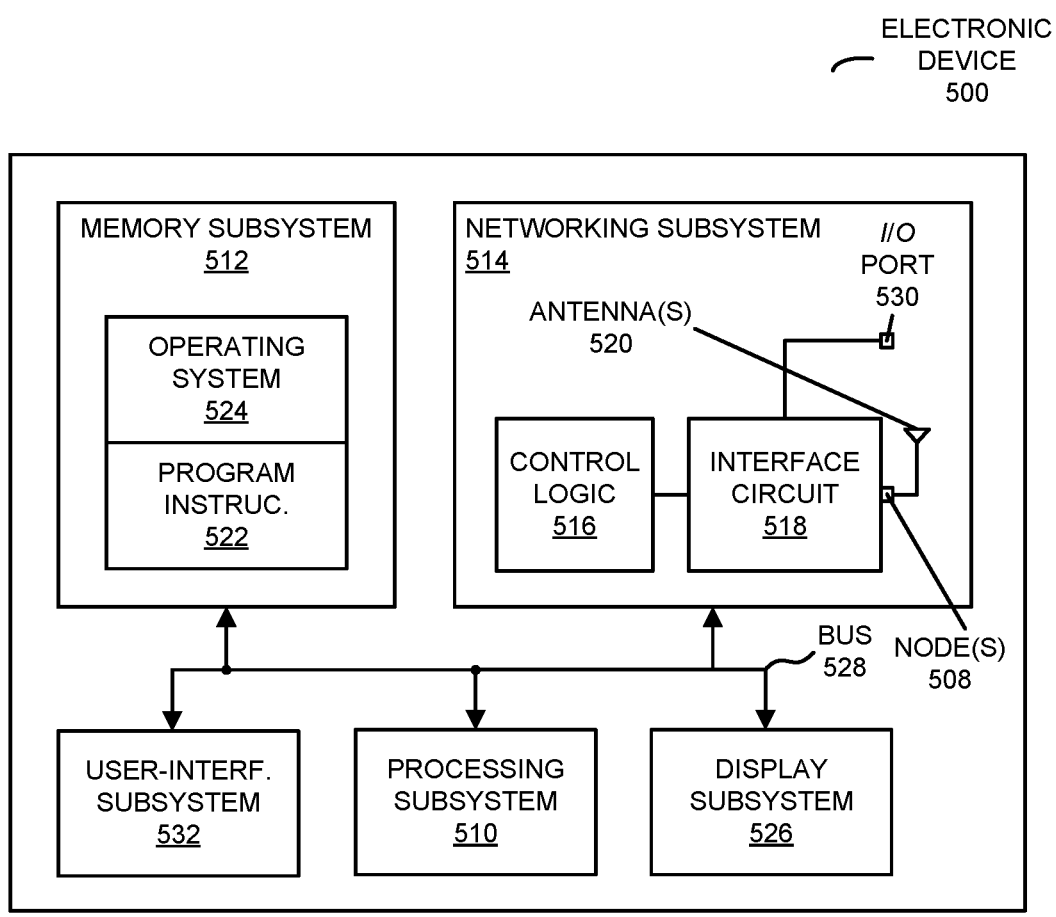
FIG. 5 is a block diagram illustrating an example of an electronic device in accordance with an embodiment of the present disclosure.

We now describe embodiments of an electronic device, which may perform at least some of the operations in the circuit techniques. FIG. 5 presents a block diagram illustrating an example of an electronic device 500, such as electronic device 100 (FIG. 1). This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, one or more graphics process units (GPUs) and/or one or more DSPs.

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or optional operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate using wired communication and/or wireless communication, including: control logic 516, an interface circuit 518 and one or more antennas 520 (or antenna elements) and/or input/output (I/O) port 530. (While FIG. 5 includes one or more antennas 520, in some embodiments electronic device 500 includes one or more nodes, such as nodes 508, e.g., a network node that can be coupled or connected to a network or link, or an antenna node or a pad that can be coupled to the one or more antennas 520. Thus, electronic device 500 may or may not include the one or more antennas 520.) For example, networking subsystem 514 can include or may be compatible with a variety of communication protocols, such as: a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, another networking system, a communication protocol associated with TCAS, a communication protocol associated with ACAS, a communication protocol associated with ADS-B, a communication protocol associated with another collision detection and avoidance system, or a communication protocol associated with another V2V communication system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or broadcast frames and/or scanning for advertising frames transmitted by other electronic devices.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a radio, a transponder, a transceiver, a type of aircraft, a computer, a computer system, a desktop computer, a laptop computer, a subnotebook/netbook, a tablet computer, a smartphone, a cellular telephone, a smartwatch, a consumer-electronic device, a portable computing device, communication equipment, a computer network device, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5, such as a user-interface subsystem 532. Also, although separate subsystems are shown in FIG. 5, in some embodiments some or all of a given subsystem or component can be integrated into one or more of the other subsystems or component(s) in electronic device 500. For example, in some embodiments program instructions 522 are included in optional operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514 (or, more generally, of electronic device 500). The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used particular communication protocols as an illustrative example, in other embodiments a wide variety of communication protocols and, more generally, wired and/or wireless communication techniques may be used. Thus, the circuit techniques may be used with a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the circuit techniques may be implemented using program instructions 522, optional operating system 524 (such as a driver for interface circuit 518) or in firmware in interface circuit 518. Alternatively or additionally, at least some of the operations in the circuit techniques may be implemented in a physical layer, such as hardware in interface circuit 518.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the circuit techniques, different numerical values may be used.

Furthermore, note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a communication circuit comprising:
      an interrogator; and
      a transponder, wherein the electronic device is configured to dynamically and temporally interleave an interrogator or a transponder transmission with a transponder response to a second interrogator or a second transponder transmission associated with a second electronic device; and
   at least an omnidirectional antenna selectively electrically coupled to the communication circuit, wherein the communication circuit and at least the omnidirectional antenna are configured to perform bidirectional communication, and wherein the bidirectional communication comprises:
      transmitting the interrogator or the transponder transmission;
      receiving the second interrogator or the second transponder transmission; or
      transmitting the transponder response to the second interrogator or the second transponder transmission, wherein the electronic device is configured to interleave transmission of an Automatic Dependent Surveillance-Broadcast (ADS-B) message with an instance of the transponder response; and
   wherein the ADS-B message is not in response to an instance of the interrogator or the transponder transmission.

2. The electronic device of claim 1, wherein the communication circuit comprises a transmit chain; and
wherein the transmit chain is configured to adjust a carrier frequency of the interrogator or the transponder transmission or the transponder response over a spectrum of frequencies.

3. The electronic device of claim 2, wherein the carrier frequency comprises: 978 MHz, 1030 MHz, 1090 MHz, 1104 MHz or another carrier frequency associated with Traffic Alert and Collision Avoidance System (TCAS), Airborne Collision Avoidance System (ACAS), Automatic Dependent Surveillance-Broadcast (ADS-B), another collision detection and avoidance system, or another vehicle-to-vehicle (V2V) communication system.

4. The electronic device of claim 2, wherein the communication circuit comprises a self-test path; and
wherein, when the communication circuit has not received another instance of the second interrogator or the second transponder transmission with a predefined time interval, and when the communication circuit is not transmitting the interrogator or the transponder transmission or the transponder response, the electronic device is configured to:
selectively electrically couple an output of the transmit chain to an input of an amplifier in the receive chain; and
selectively electrically couple a test signal at the input to the amplifier, wherein the receive chain is configured to determine whether a power level, a modulation of the test signal or both are correct.

5. The electronic device of claim 1, wherein the electronic device comprises a second omnidirectional antenna and the communication circuit is configured to selectively electrically couple to the second omnidirectional antenna.

6. The electronic device of claim 5, wherein the communication circuit comprises a switching network configured to provide isolation exceeding a predefined value between the omnidirectional antenna and the second omnidirectional antenna.

7. The electronic device of claim 1, wherein the electronic device comprises multiple receive chains associated with different carrier frequencies in a spectrum of frequencies, wherein a given receive chain is associated with a given carrier frequency.

8. The electronic device of claim 7, wherein the given receive chain comprises a heterodyne receiver configured to down convert a received electrical signal corresponding to the second interrogator or the second transponder transmission to baseband.

9. The electronic device of claim 7, wherein the communication circuit comprises a transmit/receive switch configured to selectively electrically couple the multiple receive chains in parallel to at least the omnidirectional antenna when the electronic devices does not transmit the interrogator or the transponder transmission or the transponder response.

10. The electronic device of claim 1, wherein the electronic device is configured to:
receive Automatic Dependent Surveillance-Broadcast (ADS-B) messages associated with a third electronic device;
calculate received signal strengths of the ADS-B messages; and
determine a range between the electronic device and the third electronic device, a relative bearing of the electronic device and the third electronic device, or both based at least in part on: the received signal strengths, a heading of the electronic device, and an airspeed of the electronic device.

11. The electronic device of claim 10, wherein, when the range is less than a predefined value, the electronic device is configured to compute a transmit power of the interrogator or the transponder transmission based at least in part on the received signal strength and the determined range; and
wherein the interrogator transmission validates data associated with at least one of the ADS-B messages.

12. A communication circuit, comprising:
a transmit chain configured to adjust a carrier frequency of an interrogator or a transponder transmission or a transponder response over a spectrum of frequencies; and
multiple receive chains associated with different carrier frequencies in the spectrum of frequencies, wherein a given receive chain is associated with a given carrier frequency;
wherein the communication circuit is configured to selectively electrically couple the transmit chain or the multiple receive chains in parallel to at least an omnidirectional antenna;
wherein the communication circuit is configured to dynamically and temporally interleave the interrogator or the transponder transmission with the transponder response to a second interrogator or a second transponder transmission associated with an electronic device; and
wherein the communication circuit is configured to provide functions of an interrogator and a transponder by performing bidirectional communication comprising:
transmitting the interrogator or the transponder transmission;
receiving the second interrogator or the second transponder transmission; or
transmitting the transponder response to the second interrogator or the second transponder transmission, wherein the communication circuit is configured to interleave transmission of an Automatic Dependent Surveillance-Broadcast (ADS-B) message with an instance of the transponder response; and
wherein the ADS-B message is not in response to an instance of the interrogator or the transponder transmission.

13. The communication circuit of claim 12, wherein the carrier frequency comprises: 978 MHz, 1030 MHz, 1090 MHz, 1104 MHz or another carrier frequency associated with Traffic Alert and Collision Avoidance System (TCAS), Airborne Collision Avoidance System (ACAS), Automatic Dependent Surveillance-Broadcast (ADS-B), another collision detection and avoidance system, or another vehicle-to-vehicle (V2V) communication system.

14. The communication circuit of claim 12, wherein the communication circuit comprises a self-test path; and
wherein, when the communication circuit has not received another instance of the second interrogator or the second transponder transmission with a predefined time interval, and when the communication circuit is not transmitting the interrogator or the transponder transmission or the transponder response, the communication circuit is configured to:
selectively electrically couple an output of the transmit chain to an input of an amplifier in the receive chain; and
selectively electrically couple a test signal to a test detector circuit, wherein the test detector circuit is configured to determine whether a power level, a modulation of the test signal or both are correct.

15. The communication circuit of claim 12, wherein the communication circuit is configured to selectively electrically coupled to a second omnidirectional antenna; and
wherein the communication circuit comprises a switching network configured to provide isolation exceeding a predefined value between the omnidirectional antenna and the second omnidirectional antenna.

16. The communication circuit of claim 12, wherein the communication circuit comprises a transmit/receive switch configured to selectively electrically couple the multiple receive chains in parallel to at least the omnidirectional antenna when the communication circuit does not transmit the interrogator or the transponder transmission or the transponder response.

17. A method for communicating using a communication circuit, comprising:
transmitting, using a transmit chain in a communication circuit, an interrogator or a transponder transmission having a first carrier frequency, wherein the interrogator or the transponder transmission is transmitted using at least an omnidirectional antenna in the communication circuit or selectively electrically coupled to the communication circuit;
receiving, using one of multiple receive chains in the communication circuit that is selectively electrically coupled to at least omnidirectional antenna, a second interrogator or a second transponder transmission associated with an electronic device, wherein the second interrogator or the second transponder transmission has a second carrier frequency, wherein, when receiving the second interrogator or the second transponder transmission, the transmit chain is electrically decoupled from at least the omnidirectional antenna;
transmitting, using the transmit chain that is selectively electrically coupled to at least omnidirectional antenna, a transponder response having a third carrier frequency, wherein, when transmitting the transponder response, the receive chains are electrically decoupled from at least the omnidirectional antenna; and
interleaving transmission of an Automatic Dependent Surveillance-Broadcast (ADS-B) message with an instance of the transponder response, wherein the ADS-B message is not in response to an instance of the interrogator or the transponder transmission.

18. The method of claim 17, wherein, when the communication circuit has not received another instance of the second interrogator or the second transponder transmission with a predefined time interval, and when the communication circuit is not transmitting the interrogator or the transponder transmission or the transponder response, the method comprises:
selectively electrically coupling an output of the transmit chain to an input of an amplifier in the transmit chain;
selectively electrically coupling a test signal at the input to the amplifier to a test detector circuit; and
determining, using the test detector circuit, whether a power level, a modulation of the test signal or both are correct.

19. The method of claim 17, wherein, when transmitting the interrogator or the transponder transmission or the transponder response, the method comprises setting a switching network to provide isolation exceeding a predefined value between the omnidirectional antenna and a second omnidirectional antenna, which is included in or selectively electrically coupled to the communication circuit.

20. The method of claim 17, wherein the communication circuit comprises a transmit chain; and
wherein the method comprises adjusting, using the transmit chain, a carrier frequency of the interrogator or the transponder transmission or the transponder response over a spectrum of frequencies.

* * * * *